US009767191B2

(12) United States Patent
Kikuchi et al.

(10) Patent No.: US 9,767,191 B2
(45) Date of Patent: Sep. 19, 2017

(54) GROUP BASED DOCUMENT RETRIEVAL

(71) Applicant: International Business Machines Corporation, Armonk, NY (US)

(72) Inventors: Hiroaki Kikuchi, Kanagawa (JP); Yuki Makino, Tokyo (JP); Fumihiko Terui, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 14/318,854

(22) Filed: Jun. 30, 2014

(65) Prior Publication Data

US 2015/0032748 A1  Jan. 29, 2015

(30) Foreign Application Priority Data

Jul. 23, 2013  (JP) .................................. 2013-153024

(51) Int. Cl.
*G06F 7/00* (2006.01)
*G06F 17/30* (2006.01)

(52) U.S. Cl.
CPC .. *G06F 17/30705* (2013.01); *G06F 17/30619* (2013.01)

(58) Field of Classification Search
None
See application file for complete search history.

(56) References Cited

U.S. PATENT DOCUMENTS 5,535,382 A * 7/1996 Ogawa .............. G06F 17/30687
5,664,172 A * 9/1997 Antoshenkov .... G06F 17/30433
707/700

(Continued)

FOREIGN PATENT DOCUMENTS

JP   H0869471 A    3/1996
JP   H10269230    10/1998
(Continued)

OTHER PUBLICATIONS

Abstract of Japanese Patent Publication No. JPH0784839(A) entitled Data Storage Device published Mar. 31, 1995, IBM (applicant).
Notification of Reasons for Refusal, Japan Application No. 2013-153024, Feb. 5, 2016, 3 pgs.
Written Argument, Japan Application No. 2013-153024, Feb. 22, 2016, 5 pgs.

(Continued)

*Primary Examiner* — Hasanul Mobin
(74) *Attorney, Agent, or Firm* — Jared L. Montanaro (57) ABSTRACT

Embodiments relate to retrieving a document from a plurality of document groups in which mutually related documents are each included. An aspect includes acquiring a retrieval condition that includes a plurality of conditions and at least one logical operator that connects the plurality of conditions. Another aspect includes identifying, with respect to each condition of the plurality of conditions, a document group including a document satisfying the condition from among the plurality of document groups. Another aspect includes identifying a document that satisfies at least one condition. Another aspect includes determining a document that is a retrieval result by making a selection to omit or retain that depends on the at least one logical operator. Another aspect includes generating information showing the document that is the retrieval result based on the retrieval condition.

14 Claims, 7 Drawing Sheets

(56) References Cited

U.S. PATENT DOCUMENTS

| | | | |
|---|---|---|---|
| 7,181,688 B1* | 2/2007 | Umemoto | G06F 17/30719 707/E17.082 |
| 2003/0126502 A1* | 7/2003 | Litt | G01R 31/3177 714/30 |
| 2003/0177116 A1* | 9/2003 | Ogawa | G06F 17/30675 |
| 2004/0181679 A1* | 9/2004 | Dettinger | H04L 63/0428 713/193 |
| 2005/0197805 A1* | 9/2005 | Eryurek | G05B 23/0272 702/188 |
| 2008/0016505 A1* | 1/2008 | Bucklew | G06F 8/34 717/174 |
| 2008/0243836 A1* | 10/2008 | Miyoshi | G06F 17/30011 |
| 2009/0006447 A1* | 1/2009 | Balmin | G06F 17/30938 |
| 2009/0012970 A1* | 1/2009 | Ziv | G06F 17/30705 |
| 2010/0257177 A1* | 10/2010 | Yamamoto | G06F 17/3061 707/741 |
| 2010/0281030 A1* | 11/2010 | Kusumura | G06F 17/30616 707/741 |
| 2013/0073510 A1* | 3/2013 | Qiu | G06F 17/30705 706/55 |

FOREIGN PATENT DOCUMENTS

| | | |
|---|---|---|
| JP | 2000003366 A | 1/2000 |
| JP | 2001306617 A | 11/2001 |
| JP | 2005165521 A | 6/2005 |
| JP | 2006277061 A | 10/2006 |
| JP | 2007072723 A | 3/2007 |
| JP | 2007213158 A | 8/2007 |
| JP | 2008090403 A | 4/2008 |
| JP | 2010067084 A | 3/2010 |
| JP | 2010108191 A | 5/2010 |
| JP | 2010108453 A | 5/2010 |
| JP | 2012078966 A | 4/2012 |
| JP | 2012185780 A | 9/2012 |
| WO | WO2009063925 A1 | 5/2009 |

OTHER PUBLICATIONS

Decision to Grant Patent, Japan Application No. 2013-153024, May 11, 2016, 3 pgs.

* cited by examiner

GROUP BASED DOCUMENT RETRIEVAL

PRIORITY

This application claims priority to Japanese Patent Application No. 2013-153024, filed Jul. 23, 2013, and all the benefits accruing therefrom under 35 U.S.C. §119, the contents of which in its entirety are herein incorporated by reference.

TECHNICAL FIELD

The present disclosure relates generally to document retrieval, and more specifically, to retrieving documents from a plurality of documents divided into a plurality of document groups in which mutually related documents are each included.

BACKGROUND

Among document users, a user may wish to retrieve documents satisfying a retrieval condition as a document group from a plurality of documents that are divided into a plurality of document groups that include mutually related documents. For example, the user may, when performing a retrieval based on the retrieval condition "A AND B", wish to retrieve not only a document group including documents that satisfy both of the conditions A and B, but also a document group including documents which satisfy either one of the conditions A and B. Document groups may be registered including mutually related documents or that performs a retrieval in a manner that takes a document group including mutually related documents as a target. A user may wishes to retrieve documents that satisfy a retrieval condition as a document group from a plurality of documents divided into a plurality of document groups that include mutually related documents.

SUMMARY

Embodiments relate to retrieving a document from a plurality of documents divided into a plurality of document groups in which mutually related documents are each included. An aspect includes acquiring a retrieval condition that includes a plurality of conditions and at least one logical operator that connects the plurality of conditions. Another aspect includes identifying, with respect to each condition of the plurality of conditions, a document group including a document satisfying the condition from among the plurality of document groups. Another aspect includes identifying a document that satisfies at least one condition among the plurality of conditions from among the plurality of documents. Another aspect includes determining a document that is a retrieval result based on the retrieval condition by making a selection to omit or retain that depends on the at least one logical operator with respect to the document included in the document group that is identified with respect to each condition of the plurality of conditions and the identified document satisfying the at least one condition among the plurality of conditions. Another aspect includes generating information showing the document that is the retrieval result based on the retrieval condition.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

Various embodiments will now be described, by way of example only, with reference to the following drawings in which.

DETAILED DESCRIPTION

Embodiments disclosed herein relate to group-based document retrieval. An object of various embodiments is to retrieve documents that satisfy a retrieval condition as a document group from a plurality of documents divided into a plurality of document groups that include mutually related documents. To achieve the aforementioned object, various embodiments provide an apparatus for retrieving a document from a plurality of documents divided into a plurality of document groups in which mutually related documents are each included, the apparatus including: an acquisition unit for acquiring a retrieval condition that includes a plurality of conditions and at least one logical operator that connects the plurality of conditions; a document group identification unit for identifying, with respect to each condition of the plurality of conditions, a document group including a document satisfying the condition from among the plurality of document groups; a document identification unit for identifying a document that satisfies at least one condition among the plurality of conditions from among the plurality of documents; a determination unit for determining a document that is a retrieval result based on the retrieval condition by making a selection to omit or retain that depends on the at least one logical operator with respect to the document included in the document group that is identified with respect to each condition of the plurality of conditions and the identified document satisfying at least one condition among the plurality of conditions; and a generation unit for generating information showing the document that is the retrieval result based on the retrieval condition.

Here, the apparatus may further include a change unit for changing the retrieval condition so as to include: a condition with respect to the plurality of document groups of including a document that, with respect to each condition of the plurality of conditions, satisfy the condition; a condition with respect to the plurality of documents of satisfying at least one condition among the plurality of conditions; and at least two logical operators that depend on the at least one logical operator that connects the condition with respect to the plurality of document groups and the condition with respect to the plurality of documents; wherein: based on the condition with respect to the plurality of document groups, the document group identification unit identifies a document group including a document that, with respect to each condition of the plurality of conditions, satisfy the condition; based on the condition with respect to the plurality of documents, the document identification unit identifies a document satisfying at least one condition among the plurality of conditions; and the determination unit determines a document that is a retrieval result based on the retrieval condition by making the selection to omit or retain based on the at least two logical operators.

Furthermore, the apparatus may further include a storage unit for storing an index which associates each condition of the plurality of conditions with an identifier allocated to a document satisfying the condition among the plurality of documents, in which a consecutive identifier is allocated to a document that is included in each document group of the plurality of document groups; wherein: using the index, the document group identification unit identifies a document group including a document that, with respect to each condition of the plurality of conditions, satisfy the condition; and using the index, the document identification unit identifies a document satisfying at least one condition among the plurality of conditions.

Furthermore, as the information showing the document that is the retrieval result based on the retrieval condition, the generation unit may generate information showing the document group including the document that is the retrieval result or another document that is included in the document group.

In addition, various embodiments provide an apparatus for retrieving a document from a plurality of documents divided into a plurality of document groups in which mutually related documents are each included, the apparatus including: an acquisition unit for acquiring a retrieval condition including a first condition and a second condition that are connected by an AND logical operator; a document group identification unit for identifying, from among the plurality of document groups, a first document group including a document that satisfies the first condition and a second document group including a document that satisfies the second condition; a document identification unit for identifying, from among the plurality of documents, a document that satisfies at least one condition of the first condition and the second condition; a determination unit for determining that a document that is included in both of the first document group and the second document group and that is identified by the document identification unit is a document that is a retrieval result based on the retrieval condition; and a generation unit for generating information showing the document that is the retrieval result based on the retrieval condition.

Further, various embodiments also provide an apparatus for retrieving a document from a plurality of documents divided into a plurality of document groups in which mutually related documents are each included, the apparatus including: an acquisition unit for acquiring a retrieval condition including a first condition and a second condition that are connected by a NOT logical operator that follows the first condition and precedes the second condition; a document group identification unit for identifying, from among the plurality of document groups, a first document group including a document that satisfies the first condition and a second document group including a document that satisfies the second condition; a document identification unit for identifying, from among the plurality of documents, a document that satisfies the first condition; a determination unit for determining that a document that is included in the first document group and is not included in the second document group and that is identified by the document identification unit is a document that is a retrieval result based on the retrieval condition; and a generation unit for generating information showing the document that is the retrieval result based on the retrieval condition.

In addition, various embodiments provide a method for retrieving a document from a plurality of documents divided into a plurality of document groups in which mutually related documents are each included, the method including the blocks of: acquiring a retrieval condition that includes a plurality of conditions and at least one logical operator that connects the plurality of conditions; identifying, with respect to each condition of the plurality of conditions, document groups including documents satisfying each condition from among the plurality of document groups; identifying a document that satisfies at least one condition among the plurality of conditions from among the plurality of documents; determining a document that is a retrieval result based on the retrieval condition by making a selection to omit or retain that depends on the at least one logical operator with respect to the document included in the document group that is identified with respect to each condition of the plurality of conditions and the identified document satisfying the at least one condition among the plurality of conditions; and generating information showing the document that is the retrieval result based on the retrieval condition.

Further, various embodiments provide a program for causing a computer to function as an apparatus for retrieving a document from a plurality of documents divided into a plurality of document groups in which mutually related documents are each included, in which the program causes the computer to function as: an acquisition unit for acquiring a retrieval condition that includes a plurality of conditions and at least one logical operator that connects the plurality of conditions; a document group identification unit for identifying, with respect to each condition of the plurality of conditions, a document group including a document satisfying the condition from among the plurality of document groups; a document identification unit for identifying a document that satisfies at least one condition among the plurality of conditions from among the plurality of documents; a determination unit for determining a document that is a retrieval result based on the retrieval condition by making a selection to omit or retain that depends on the at least one logical operator with respect to the document included in the document group that is identified with respect to each condition of the plurality of conditions and the identified document satisfying the at least one condition among the plurality of conditions; and a generation unit for generating information showing the document that is the retrieval result based on the retrieval condition. Documents that satisfy a retrieval condition can be retrieved as a document group from a plurality of documents that are divided into a plurality of document groups that include mutually related documents.

An embodiment is described in detail hereunder with reference to the accompanying drawings. According to an embodiment, a document that satisfies a retrieval condition as a document group is retrieved from a plurality of documents that are divided into document groups that include mutually related documents. As used herein, the term "mutually related documents" refers to documents having some kind of relation therebetween, and the relation may be a relation in which a master and servant exist or may be an equal relation in which a master and servant do not exist. Hereunder, as "mutually related documents", an example of documents that are in a parent-child relationship is described. For example, if the text of an electronic mail is regarded as a parent document and an attached file of the electronic mail is regarded as a child document, these documents can be said to be in a parent-child relationship. Similarly, if a Web page that is the origin of a link is regarded as a parent document and a Web page that is linked from the origin is regarded as a child document, it can be said that these are also documents that are in a parent-child relationship. Further, although various conditions are conceivable as a "retrieval condition", such as a condition relating to a phrase that appears in a document or a condition relating to the size of a document, in the following description, a condition relating to a phrase that appears in a document, that is, a condition that a phrase to be searched appears in a document is taken as an example retrieval condition.

Figure 1:
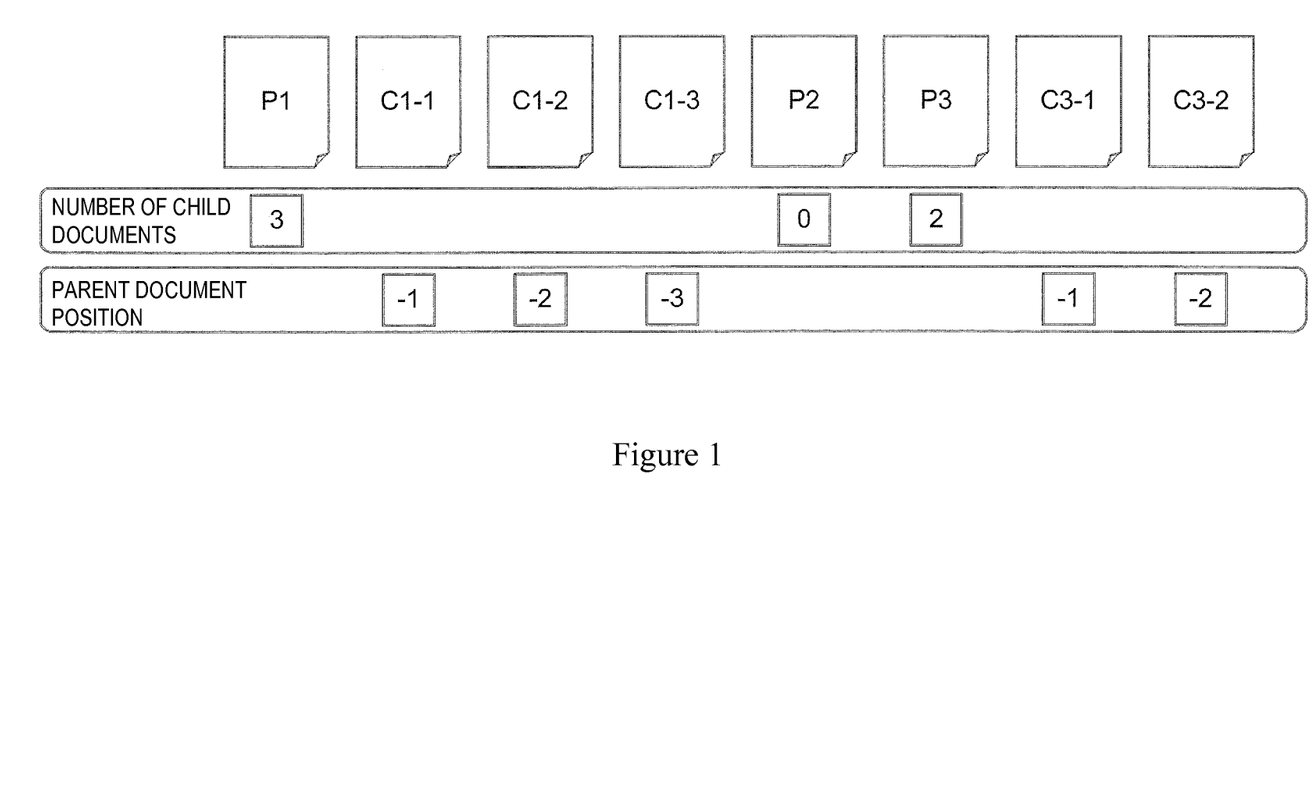
FIG. 1 illustrates an index that is created according to an embodiment.

In some embodiments, first, an index that is used for retrieving a document is created. FIG. 1 is a view that schematically illustrates an index that is created in an embodiment.

In some embodiments, an inverted index is used to retrieve at high speed a document in which a certain phrase appears. The inverted index is an index that, with respect to each of a plurality of phrases, holds a document number as an example of an identifier that is allocated to a document in which the phrase appears. When creating the inverted index, consecutive document numbers are allocated to documents that are in a parent-child relationship. In FIG. 1, since documents are arranged in order of document numbers, documents that are in a parent-child relationship are arranged consecutively. That is, consecutive document numbers are allocated to a parent document P1 and child documents C1-1, C1-2, and C1-3, and consecutive document numbers are allocated to a parent document P3 and child documents C3-1 and C3-2. In the inverted index, document numbers are arranged in ascending order and compressed, and consequently when consecutive document numbers are allocated to documents that are in a parent-child relationship, retrieval can be performed more efficiently than in a case where discrete document numbers are allocated to documents in a parent-child relationship.

Furthermore, according to some embodiments, additional information is recorded with respect to each document number in the inverted index to indicate parent-child relationships. In this case, the additional information includes information showing the number of child documents that shows how many child documents a parent document has. In FIG. 1, the information showing the number of child documents includes information showing that the parent document P1 has three child documents, information showing that the parent document P2 does not have any child documents, and information showing that the parent document P3 has two child documents. The additional information also includes information showing a parent document position that shows the number of document positions by which the position of the parent document is separated from the child document as counted from the child document. Since the information showing the parent document position shows a position that is traced back from the child document in the direction of smaller document numbers, the information shows a negative number. In FIG. 1, information which shows that the parent document P1 is arranged at the first, second, and third document positions as counted from the child documents C1-1, C1-2, and C1-3, respectively, and information which shows that the parent document P3 is arranged at the first and second document positions as counted from the child documents C3-1 and C3-2, respectively, is recorded as the information showing the parent document position.

Additionally, if the parent-child relationship has a hierarchical structure, it is also possible to record information showing the hierarchical structure and use that information when performing processing. For example, in a case where the text of an electronic mail is a parent document and an attached file of the electronic mail is a child document, if it is assumed that the attached file is a compressed file (a ZIP file or the like) in which a plurality of non-compressed files are collected together and compressed, the compressed file can be regarded as a child document and the plurality of non-compressed files can be regarded as grandchild documents.

Note that since the index does not differ from a conventional index except that consecutive document numbers are allocated to documents in a parent-child relationship, the index can be accessed using existing programs.

Figure 2:
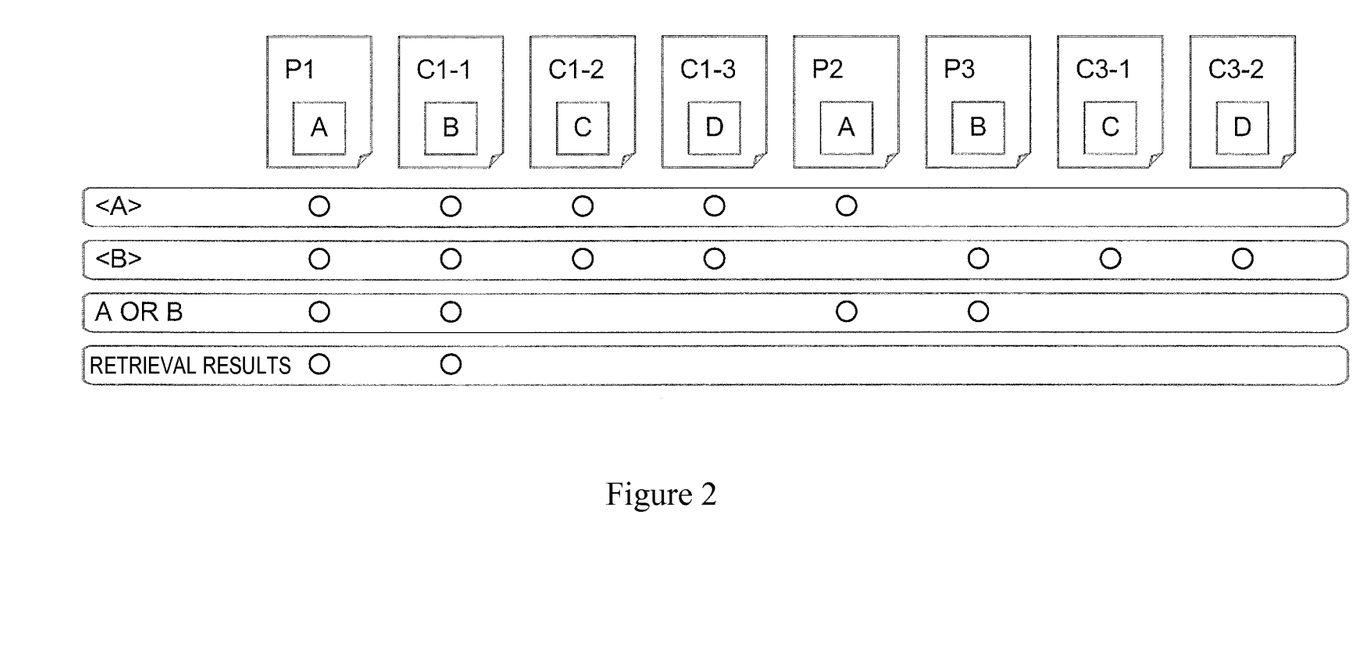
FIG. 2 is a view that schematically illustrates scanning of the index according to an embodiment.

Next, in an embodiment, documents are retrieved by scanning the index. FIG. 2 is a view that schematically illustrates scanning of the index according to an embodiment.

In FIG. 2, first, it is shown that phrases A, B, C, and D appear in the respective documents. That is, the phrase A appears in the document P1, the phrase B appears in the document C1-1, the phrase C appears in the document C1-2, and the phrase D appears in the document C1-3. Further, the phrase A appears in the document P2, the phrase B appears in the document P3, the phrase C appears in the document C3-1, and the phrase D appears in the document C3-2. In this state, for example, if there is a request to retrieve documents in which the phrase B appears, according to the conventional method, the document C1-1 and the document P3 will be the retrieval results.

In contrast, a case will now be considered in which a Boolean retrieval is requested. The term "Boolean retrieval" refers to a retrieval that is performed by means of a retrieval query in which phrases to be searched are connected by a logical operator in order to narrow down the retrieval results. According to an embodiment, when performing such a retrieval, an evaluation is performed with regard to whether or not a condition that a phrase to be searched appears in a document group that includes documents that are in a parent-child relationship (hereunder, referred to as "parent-child document group") is satisfied. That is, with respect to documents belonging to the same parent-child document group, an evaluation spanning such documents is performed. Therefore, when a retrieval is requested which necessitates such an evaluation that spans documents belonging to the same parent-child document group, the processing is branched and the retrieval query is modified to perform the retrieval.

In this case, an AND retrieval and a NOT retrieval are retrievals which necessitate an evaluation that spans documents belonging to the same parent-child document group. For example, if it is assumed that the retrieval query is "A AND B", this retrieval query is changed to "<A> AND <B> AND (A OR B)".

In the retrieval query after the change, "<A>" indicates a component that, in a case where the phrase A was found in at least one document included in the parent-child document group, behaves as though all documents included in the parent-child document group were hit. That is, "<A>" indicates a condition that all documents in a parent-child document group that includes a document in which the phrase A appears are treated as retrieval results. In the index, since documents that are in a parent-child relationship are arranged consecutively, the direction of a scan of the index with "<A>" is monotonic and is efficiently performed. In FIG. 2, since the phrase A was found in the document P1, it is indicated by circles that the documents P1, C1-1, C1-2, and C1-3 that are included in the parent-child document group that includes the document P1 were hit, and since the phrase A was found in the document P2, it is indicated by a circle that the document P2 that is the only document included in the parent-child document group that includes the document P2 was hit.

Further, "<B>" is a similar condition in relation to the phrase B. In FIG. 2, since the phrase B was found in the document C1-1, it is indicated by circles that the documents P1, C1-1, C1-2, and C1-3 that are included in the parent-child document group that includes the document C1-1 were hit, and since the phrase B was found in the document P3, it is indicated by circles that the documents P3, C3-1 and C3-2 that are included in the parent-child document group that includes the document P3 were hit.

In addition, "A OR B" is a condition that the phrase A or the phrase B appears. In FIG. 2, since the phrase A was found in the document P1, the phrase B was found in the document C1-1, the phrase A was found in the document P2, and the phrase B was found in the document P3, it is indicated by circles that these documents were hit.

Since the retrieval query is one in which these conditions are connected by AND, common documents among the documents that were hit in the scan of the index with "<A>", the documents that were hit in the scan of the index with "<B>", and the documents that were hit in the scan of the index with "A OR B" are taken as the retrieval results. In FIG. 2, it is indicated by circles that the document P1 and the document C1-1 are the retrieval results.

Note that if the retrieval query is assumed to be "A NOT B", the retrieval query will be changed to "<A> NOT <B>AND A". In this case, similarly to when the retrieval query is "A AND B", the documents P1, C1-1, C1-2, C1-3, and P2 will be hit in the scan of the index with <A>, and the documents P1, C1-1, C1-2, C1-3, P3, C3-1, and C3-2 will be hit in the scan of the index with <B>. However, since the third condition is "A", which is different from when the retrieval query is "A AND B", only the documents P1 and P2 will be hit in the scan of the index with this condition. Since the retrieval query is one in which <A> and <B> are connected by NOT and the result thereof and "A" are connected by AND, the document P2 that is a common document among the documents remaining after documents that were hit by the scan of the index with "<B>" are excluded from documents that were hit by the scan of the index with "<A>", and documents that were hit by the scan of the index with "A" is the retrieval result.

Figure 3:
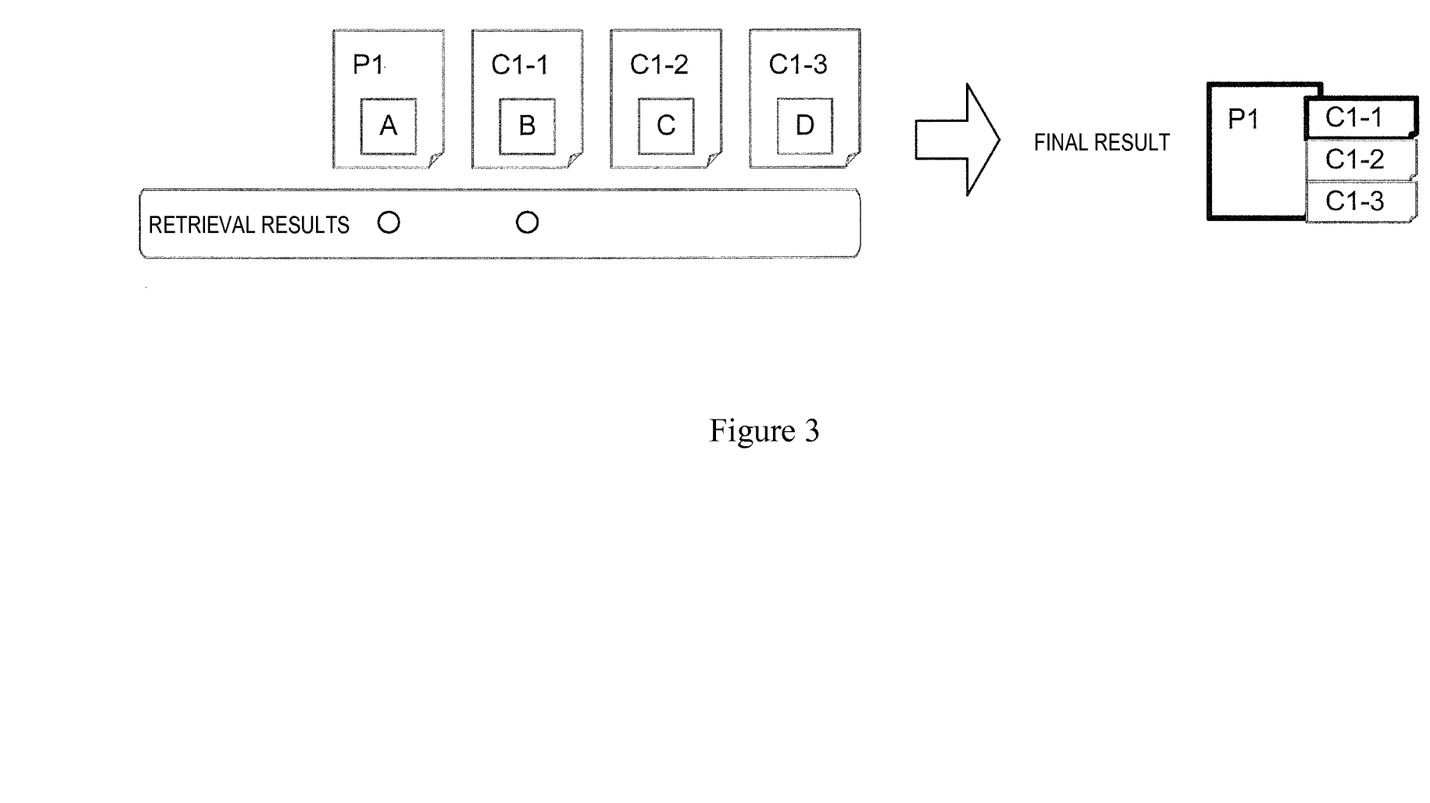
FIG. 3 is a view that schematically illustrates processing that is executed when returning retrieval results in an embodiment.

Next, according an embodiment, when returning retrieval results, a parent-child relationship is checked, and if a retrieval result is a child document, the retrieval result is adjusted. FIG. 3 is a view that schematically illustrates processing when returning retrieval results in an embodiment.

As shown in FIG. 3, according to an embodiment, information of the child documents (document names or the like) is mapped in the information of the parent document (document name or the like) by utilizing information showing a parent-child relationship and the resulting information is returned. More specifically, with respect to a child document that was hit, information showing the parent document position that was added to the inverted index is referred to and the parent document is identified, and the information of the parent document is returned as the result. At this time, the information of the child document that was hit may also be added to the information of the parent document. Alternatively, a configuration may be adopted in which information showing the number of child documents that was added to the inverted index is referred to and the child documents of the parent document are identified, and information of all the child documents that also includes child documents that have not been hit is added to the information of the parent document. In addition, a configuration may be adopted that refers to the information of the retrieval results and shows the user which documents the phrase to be searched appears in. In FIG. 3, the parent document P1 and the child document C1-1 are the retrieval results. Therefore, in the retrieval results that are ultimately output (hereunder, referred to as "final result"), the child documents C1-1, C1-2, and C1-3 are added to the parent document P1, and the documents P1 and C1-1 that were hit are indicated by thick frames surrounding them.

According to an embodiment, by performing the above described processing when returning retrieval results, since both a parent document and a child document that contributed to a retrieval condition are returned as evaluation results, retrieval results can be returned that flexibly reflect the parent-child relationship. Thus, as the number of retrieval results, the number of parent-child document groups that were hit is returned. For example, in a case where an index was created with respect to items of electronic mail, the number of hits is the number of electronic mail items that were hit. In addition, if the information of a child document that was hit is added to the information of the parent document, it is possible to obtain information that shows what child document was hit, for example.

According to an embodiment, by not modifying a retrieval query when scanning the index, it is possible to perform a retrieval that does not take a parent-child relationship into consideration. For example, an AND retrieval can be evaluated with respect to only the contents of each document. Further, by not performing the adjustment when processing retrieval results, it is also possible to evaluate and display retrieval results without taking a parent-child relationship into consideration. Such a configuration meets a demand in a case where a user wants to perform an evaluation of a retrieval condition that takes a parent-child relationship into consideration, but wants to display a retrieval result for each document. In addition, if neither modification of a retrieval query when scanning the index nor adjustment when processing a retrieval result is performed, both evaluation of a retrieval condition and display of retrieval results can be performed without taking a parent-child relationship into consideration. By previously creating the index shown in FIG. 1, an embodiment eliminates the need to recreate an index for each retrieval, even when performing various retrievals in the above manner.

Note that a user may designate which of the various retrievals is to be performed. Although, in the above example, the retrieval query is modified and the retrieval result is adjusted when a Boolean retrieval is requested, it is assumed in the following description that when a user requests a retrieval which necessitates an evaluation that spans documents belonging to the same parent-child document group, the retrieval query is modified and the retrieval results are adjusted, while in other cases only adjustment of the retrieval results is performed.

Figure 4:
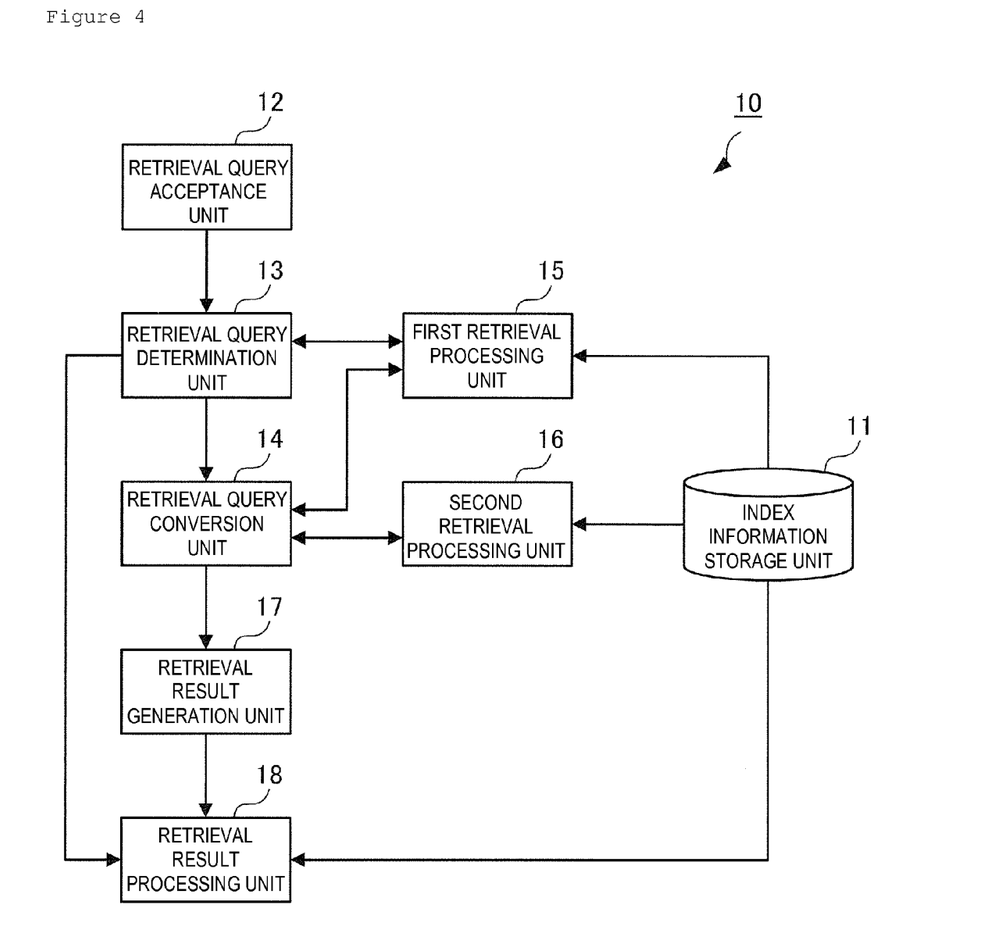
FIG. 4 is a block diagram that illustrates an example of the functional configuration of a document retrieval apparatus according to an embodiment.

FIG. 4 is a block diagram that illustrates an example of the functional configuration of a document retrieval apparatus 10 in an embodiment. As shown in the drawing, the document retrieval apparatus 10 includes an index information storage unit 11, a retrieval query acceptance unit 12, a retrieval query determination unit 13, and a retrieval query conversion unit 14. The document retrieval apparatus 10 also includes a first retrieval processing unit 15, a second retrieval processing unit 16, a retrieval result generation unit 17, and a retrieval result processing unit 18.

The index information storage unit 11 stores index information that is used for retrieving a document. In this case, the index information includes an inverted index which associates a phrase with a document number of a document in which the phrase appears, and as described above, consecutive document numbers are allocated to documents included in a parent-child document group. Further, as shown in FIG. 1, the index information includes additional information that was added to the inverted index, and the additional information includes information showing the number of child documents that shows how many child documents a parent document has, and information showing a parent document position that shows the number of document positions by which the position of the parent document is separated from the child document as counted from the child document. According to an embodiment, the index information storage unit 11 is provided as one example of a storage unit that stores the index.

The retrieval query acceptance unit 12 accepts a retrieval query that is a character string representing a retrieval condition for retrieving a document when a user uses a keyboard/mouse 90i (see FIG. 7), or the like to input the retrieval query. According to an embodiment, the retrieval query acceptance unit 12 is provided as one example of an acquisition unit that acquires a retrieval condition.

The retrieval query determination unit 13 determines whether or not a retrieval query that the retrieval query acceptance unit 12 accepted is a retrieval query that necessitates an evaluation that spans documents belonging to the same parent-child document group. In this case, as described above, it is good to perform this determination based on whether or not the accepted retrieval query is one that the user designated as a retrieval query that necessitates an evaluation that spans documents belonging to the same parent-child document group. If it is determined that the retrieval query does not necessitate an evaluation that spans documents belonging to the same parent-child document group, a condition included in the retrieval query is passed to the first retrieval processing unit 15, while if it is determined that the retrieval query necessitates an evaluation that spans documents belonging to the same parent-child document group, the retrieval query is passed to the retrieval query conversion unit 14. Further, when a document number of a document found in the retrieval is returned from the first retrieval processing unit 15, the retrieval query determination unit 13 passes the document number to the retrieval result processing unit 18 as a retrieval result.

The retrieval query conversion unit 14 converts the retrieval query that was passed thereto from the retrieval query determination unit 13 into a retrieval query that includes a condition which is evaluated as being satisfied or not as a parent-child document group, a condition which is evaluated as being satisfied or not as individual documents, and a logical operator that connects these conditions. The retrieval query conversion unit 14 sets the latter condition and calls the first retrieval processing unit 15, and sets a phrase that is a retrieval target that is specified by the former condition and calls the second retrieval processing unit 16. In this case, if there is a plurality of conditions as the latter condition, the first retrieval processing unit 15 can be called for each condition, and if there is a plurality of phrases as phrases that are retrieval targets specified by the former condition, the second retrieval processing unit 16 can be called for each phrase. Further, when document numbers of documents found by the retrieval are returned from the first retrieval processing unit 15 and the second retrieval processing unit 16, the retrieval query conversion unit 14 passes the document numbers to the retrieval result generation unit 17. According to an embodiment, the retrieval query conversion unit 14 is provided as one example of a change unit that changes a retrieval condition.

When a condition which is evaluated as being satisfied or not as individual documents is accepted from the retrieval query determination unit 13 or the retrieval query conversion unit 14, the first retrieval processing unit 15 retrieves a document that satisfies the condition using the inverted index stored in the index information storage unit 11. The first retrieval processing unit 15 returns the document number of a document that was found by the retrieval to the caller among the retrieval query determination unit 13 and the retrieval query conversion unit 14. According to an embodiment, the first retrieval processing unit 15 is provided as one example of a document identification unit that identifies a document.

Upon accepting a phrase that is specified by a condition which is evaluated as being satisfied or not as a parent-child document group from the retrieval query conversion unit 14, the second retrieval processing unit 16 retrieves documents in which the phrase appears using the inverted index that is stored in the index information storage unit 11. Further, the second retrieval processing unit 16 identifies a parent-child document group that includes the document using the information showing parent document positions that is stored in the index information storage unit 11, and identifies documents included in the parent-child document group using the information showing the number of child documents that is stored in the index information storage unit 11. The second retrieval processing unit 16 returns the document numbers of documents found by the retrieval to the retrieval query conversion unit 14. According to an embodiment, the second retrieval processing unit 16 is provided as one example of a document group identification unit that identifies a document group.

The retrieval result generation unit 17 accepts document numbers of documents found by the retrieval by the first retrieval processing unit 15, and document numbers of documents found by the retrieval by the second retrieval processing unit 16 from the retrieval query conversion unit 14, and generates retrieval results based on the document numbers. More specifically, the retrieval result generation unit 17 identifies documents that are retrieval results based on the documents found by the retrieval by the first retrieval processing unit 15, the documents found by the retrieval by the second retrieval processing unit 16, and a logical operator included in the retrieval query after conversion. According to an embodiment, the retrieval result generation unit 17 is provided as one example of a determination unit that determines documents that are retrieval results based on a retrieval condition.

Figure 7:
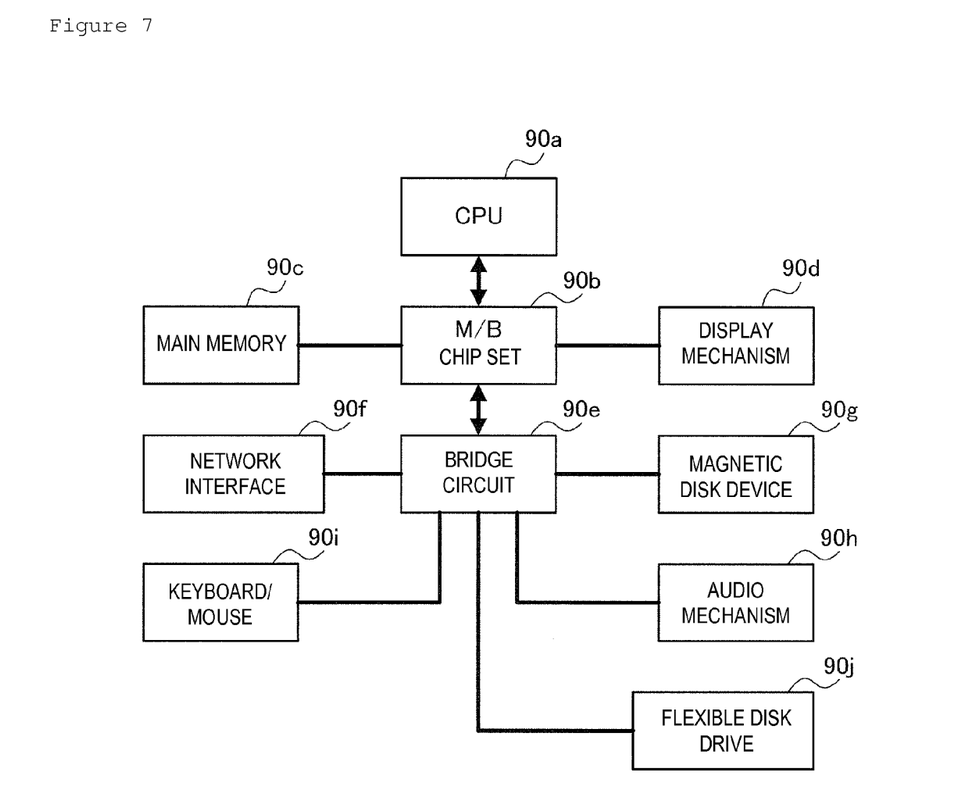
FIG. 7 is a diagram that illustrates an example of a hardware configuration of a computer that may be used in conjunction with various embodiments

When retrieval results are passed thereto from the retrieval query determination unit 13 or from the retrieval result generation unit 17, the retrieval result processing unit 18 generates a final result by subjecting the retrieval results to processing for displaying the retrieval results on a display mechanism 90*d* (see FIG. 7). Here, as the final result, the retrieval result processing unit 18 generates results in which information showing a parent-child relationship is added to the information of the documents that are the retrieval results. According to an embodiment, the retrieval result processing unit 18 is provided as one example of a generation unit that generates information showing a document that is a retrieval result.

Figure 5:
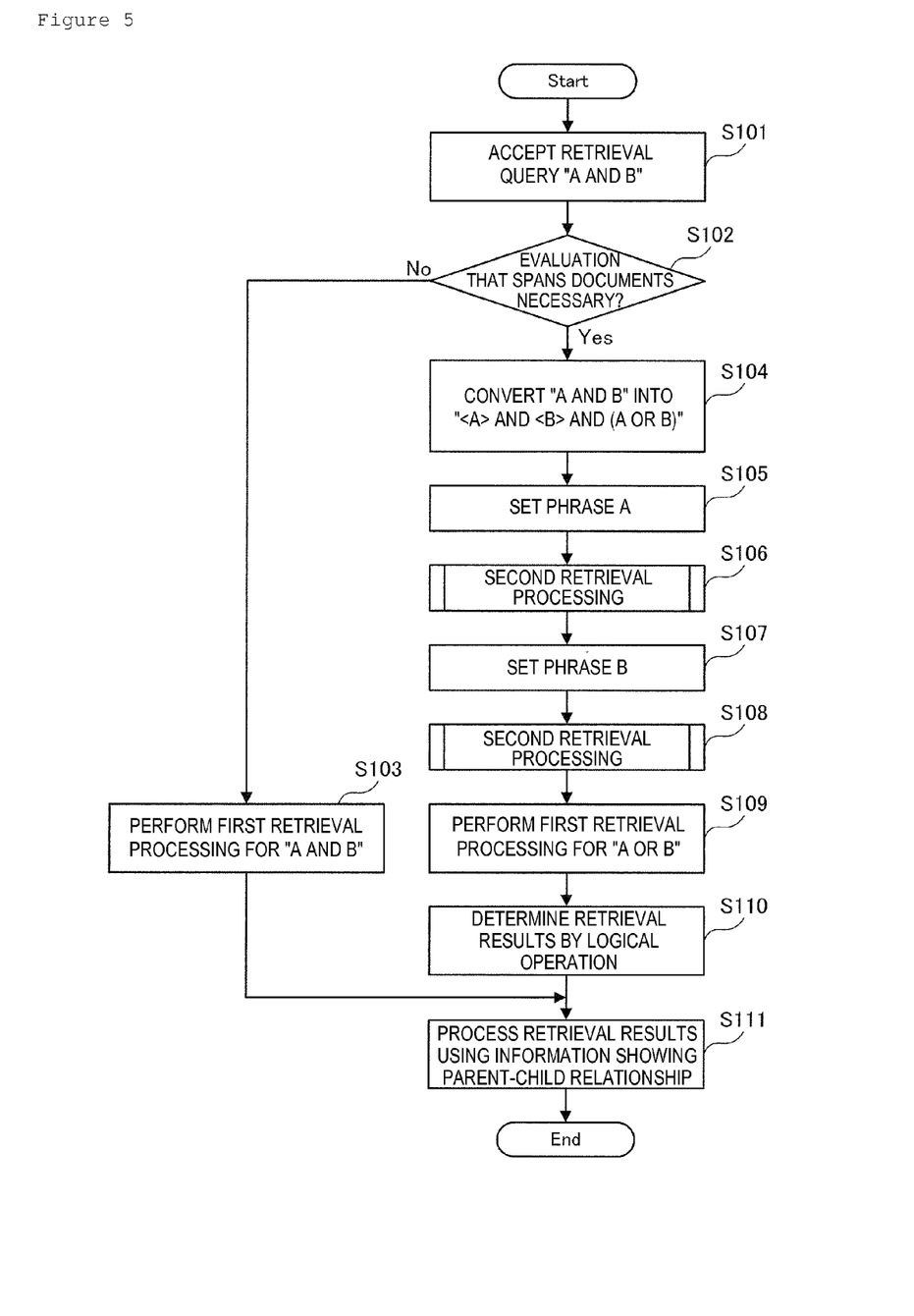
FIG. 5 is a flowchart that illustrates an example of an operation of the document retrieval apparatus according to an embodiment.

FIG. 5 is a flowchart that illustrates an example of an operation of the document retrieval apparatus 10 in an embodiment. The operation starts when a user inputs a retrieval query using the keyboard/mouse 90*i* (see FIG. 7) or the like. In the following description, it is assumed that the user inputs a retrieval query "A AND B".

When the operation starts, first, the retrieval query acceptance unit 12 accepts the retrieval query "A AND B" that the user inputs (block 101). The retrieval query is passed from the retrieval query acceptance unit 12 to the retrieval query determination unit 13. The retrieval query determination unit 13 determines whether or not the retrieval query is a query that necessitates an evaluation that spans documents belonging to the same parent-child document group (block 102).

If it is determined as a result that the retrieval query does not necessitate an evaluation that spans documents belonging to the same parent-child document group, the retrieval query determination unit 13 passes the condition "A AND B" included in the retrieval query to the first retrieval processing unit 15, and the first retrieval processing unit 15 refers to the inverted index stored in the index information storage unit 11 to retrieve documents that satisfy the condition (block 103). Thereafter, the retrieval results are returned from the first retrieval processing unit 15 to the retrieval query determination unit 13, and then passed to the retrieval result processing unit 18, and the retrieval result processing unit 18 subjects the retrieval results to processing for displaying the retrieval results on the display mechanism 90*d* (block 111).

In contrast, if it is determined that the retrieval query necessitates an evaluation that spans documents belonging to the same parent-child document group, the retrieval query determination unit 13 passes the retrieval query to the retrieval query conversion unit 14, and the retrieval query conversion unit 14 converts the retrieval query "A AND B" into a retrieval query "<A> AND <B> AND (A OR B)" (block 104).

Then, the retrieval query conversion unit 14 sets the phrase A (block 105), and invokes second retrieval processing by the second retrieval processing unit 16 (block 106). Thereupon, retrieval of documents in which the phrase A appears is performed by the second retrieval processing unit 16, and document numbers of documents that were hit in the retrieval are returned from the second retrieval processing unit 16 to the retrieval query conversion unit 14. Then, the retrieval query conversion unit 14 sets the phrase B (block 107), and invokes the second retrieval processing by the second retrieval processing unit 16 (block 108). Thereupon, retrieval of documents in which the phrase B appears is performed by the second retrieval processing unit 16, and document numbers of documents that were hit in the retrieval are returned from the second retrieval processing unit 16 to the retrieval query conversion unit 14. Note that, operations of the second retrieval processing that is invoked after setting the phrase A or the phrase B are described in detail later.

On the other hand, the condition "A OR B" is passed from the retrieval query conversion unit 14 to the first retrieval processing unit 15, and the first retrieval processing unit 15 refers to the inverted index stored in the index information storage unit 11 to retrieve documents that satisfy this condition (block 109). Document numbers of documents hit in the retrieval performed by the first retrieval processing unit 15 are returned from the first retrieval processing unit 15 to the retrieval query conversion unit 14.

Thereafter, the document numbers of documents that were hit in the second retrieval processing in block 106, the document numbers of documents that were hit in the second retrieval processing in block 108, and the document numbers of documents that were hit in the first retrieval processing in block 109 are passed from the retrieval query conversion unit 14 to the retrieval result generation unit 17, and the retrieval result generation unit 17 performs a logical operation to determine common documents among the documents having these document numbers, and takes the thus-determined common documents to be the retrieval results (block 110). The retrieval result generation unit 17 passes the retrieval results to the retrieval result processing unit 18, and the retrieval result processing unit 18 subjects the retrieval results to processing for displaying the retrieval results on the display mechanism 90*d* (block 111).

Figure 6:
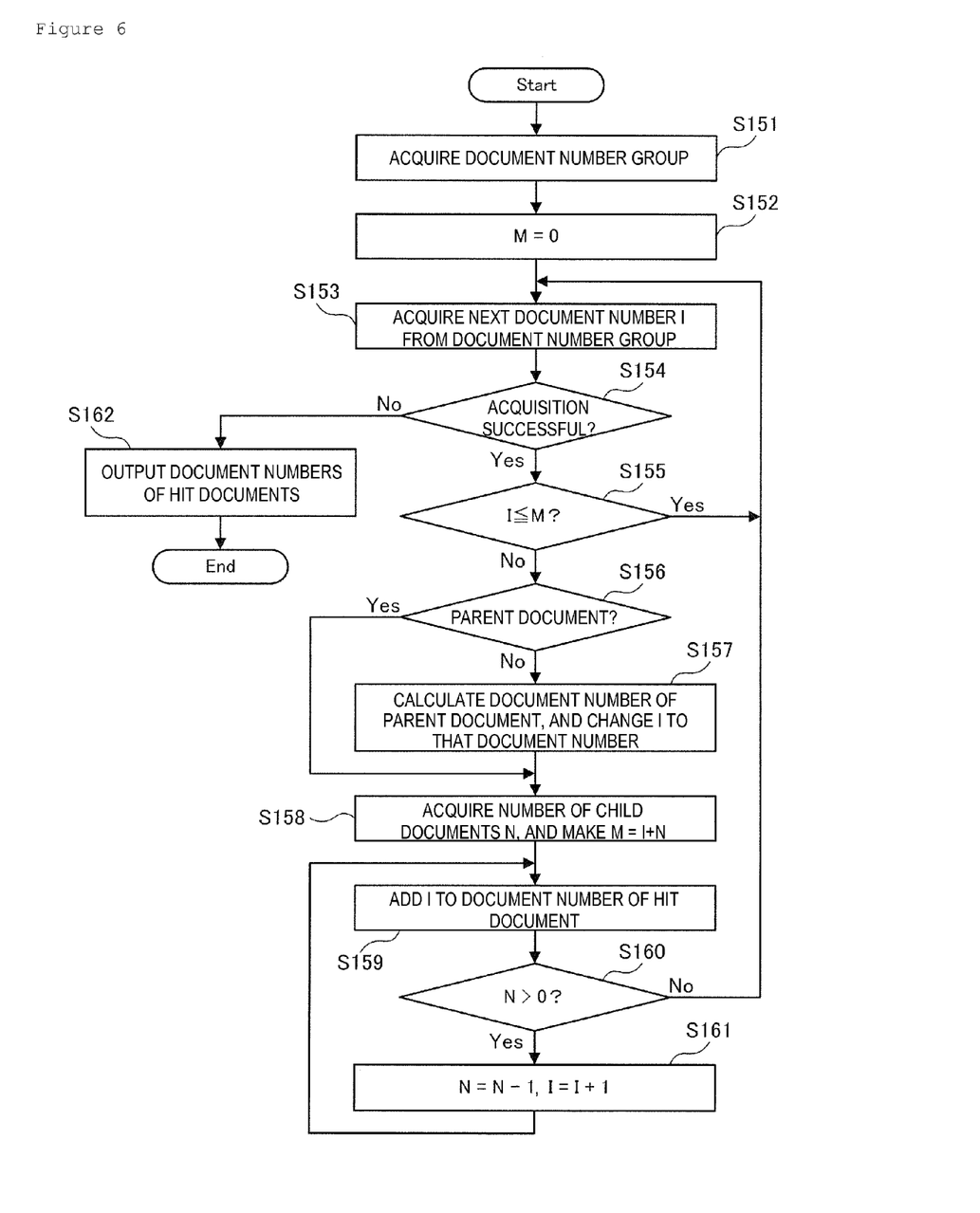
FIG. 6 is a flowchart that illustrates an example of an operation in second retrieval processing that is performed by a second retrieval processing unit of an embodiment.

FIG. 6 is a flowchart that illustrates an example of an operation in the second retrieval processing performed by the second retrieval processing unit 16 that is invoked in block 106 and block 108 of FIG. 5. Note that, in this case, an operation in a case where the phrase A is set in block 105 of FIG. 5 and the processing is called in block 106 is described.

When the operation starts, the second retrieval processing unit 16 first refers to the inverted index stored in the index information storage unit 11 and acquires a document number group that includes the document numbers of documents in which the phrase A appears (block 151). Next, the second retrieval processing unit 16 assigns 0 to a variable M that is used to exclude a second document and subsequent documents in a case where the phrase A appears in a plurality of documents included in the same parent-child document group (block 152). The second retrieval processing unit 16 then acquires a next document number I from the document number group (block 153), and determines whether or not acquisition of the document number I succeeded (block 154).

If the result determined in block 154 is that acquisition of the document number I succeeded, the second retrieval processing unit 16 determines whether or not the document number I is less than or equal to the variable M (block 155). When it is known that the phrase A appears in one document included in a certain parent-child document group, since the document number of the last document included in the parent-child document group is assigned to the variable M in a block 158 that is described later, the process in block 155 is performed to check whether the document number I is the document number of a second or subsequent document among the plurality of documents in which the phrase A appears that are included in the same parent-child document group. In this case, if the second retrieval processing unit 16 determines that the document number I is less than or equal to the variable M, that is, that the document number I is the document number of a second or subsequent document among the plurality of documents in which the phrase A appears that are included in the same parent-child document group, the processing to record a document number of a hit document with respect to the parent-child document group ends, and consequently the second retrieval processing unit 16 acquires the next document number I from the document number group (block 153).

Further, if it is determined that the document number I is not less than or equal to the variable M, that is, if it is determined that the document number I is not the document number of a second or subsequent document among the plurality of documents in which the phrase A appears that are included in the same parent-child document group, the second retrieval processing unit 16 determines whether or not the document number I is the document number of a parent document (block 156). In this case, if it is determined that the document number I is the document number of a parent document, the second retrieval processing unit 16 refers to the information showing the number of child documents that is stored in the index information storage unit 11 and acquires the number of child documents N, and sets the variable M to (I+N) (block 158). Further, if it is determined that the document number I is not the document number of a parent document, that is, if it is determined that the document number I is the document number of a child document, the second retrieval processing unit 16 refers to the information showing a parent document position that is stored in the index information storage unit 11 and calculates the document number of the parent document and changes the document number I to the document number of the parent document (block 157), and next refers to the information showing the number of child documents that is stored in the index information storage unit 11 and acquires the number of child documents N, and sets the variable M to (I+N) (block 158).

Thereafter, the second retrieval processing unit 16 performs processing that records the document number of a document included in the parent-child document group that includes the aforementioned parent document, as the document number of a hit document. That is, the second retrieval processing unit 16 adds the document number I to the document number of the hit document (block 159). Next, the second retrieval processing unit 16 determines whether or not the number of child documents N is greater than 0 (block 160). In this case, if the number of child documents N is greater than 0, the second retrieval processing unit 16 subtracts 1 from the number of child documents N, and adds 1 to the document number I (block 161), and proceeds to block 159. If the number of child documents N is not greater than 0, that is, if the number of child documents N has reached 0, the second retrieval processing unit 16 acquires the next document number I from the document number group (block 153).

On the other hand, if it is determined in block 154 that acquisition of the document number I was not successful, the second retrieval processing unit 16 outputs the document numbers that were recorded as the document numbers of hit documents up to the present time to the retrieval query conversion unit 14 (block 162).

Note that, although "A AND B" and "A NOT B" have been exemplified as retrieval queries according to an embodiment, various embodiments are also applicable to a retrieval query in which a plurality of conditions are connected by an AND logical operator or a NOT logical operator. More specifically, if a retrieval query is one in which a plurality of conditions are connected by an AND logical operator, a common document among documents that are included in document groups including documents which, with respect to each condition of the plurality of conditions, satisfy the relevant condition, and documents that satisfy at least one condition among the plurality of conditions may be taken as a retrieval result. Further, if the retrieval query is one in which a plurality of conditions are connected by a NOT logical operator, a common document among documents that satisfy a first condition among the plurality of conditions and documents remained by excluding documents included in document groups that include documents which, with respect to each of a second condition and subsequent conditions among the plurality of conditions, satisfy the relevant condition from documents that are included in document groups that include documents that satisfy the first condition among the plurality of conditions is taken as a retrieval result. In addition, the logical operators are not limited to an AND logical operator and a NOT logical operator, and various embodiments are also applicable to a retrieval query in which a plurality of conditions are connected by a logical operator other than an AND logical operator and a NOT logical operator.

Furthermore, although the retrieval query conversion unit 14 converts a retrieval query, and the retrieval processing in blocks 106, 108 and 109 of FIG. 5 is performed based on the converted retrieval query in the above embodiment, this is shown for illustrative purposes only. That is, processing for obtaining the same results as the retrieval processing in blocks 106, 108 and 109 of FIG. 5 without converting a retrieval query may be performed.

In addition, although the inverted index is used as an index and consecutive identifiers are allocated to mutually related documents in the above embodiment, this is shown for illustrative purposes only. That is, an index other than the inverted index may be used in which consecutive identifiers may not be allocated to mutually related documents.

As described in the foregoing, the embodiment acquires a retrieval condition that includes a plurality of conditions and at least one logical operator that connects the plurality of conditions, identifies, with respect to each condition of the plurality of conditions, a document group including a document that satisfies the condition from among a plurality of document groups, identifies a document that satisfies at least one condition among the plurality of conditions from among a plurality of documents, determines a document that is a retrieval result based on the retrieval condition by making a selection to omit or retain that depends on the at least one logical operator with respect to the document included in the document group identified with respect to each condition of the plurality of conditions and the identified document that satisfies at least one condition among the plurality of conditions, and generates information showing the document that is the retrieval result based on the retrieval condition. It is thereby possible to retrieve documents that satisfy a retrieval condition as a document group from a plurality of documents that are divided into a plurality of document groups that include mutually related documents.

Finally, the hardware configuration of a computer that is suitable for application of various embodiments will be described.

FIG. 7 is a diagram that illustrates an example of the hardware configuration of such a computer. As illustrated in the drawing, the computer includes a CPU (central processing unit) 90a which is arithmetic operation means, a main memory 90c connected to the CPU 90a via an M/B (mother board) chip set 90b, and a display mechanism 90d also connected to the CPU 90a via the M/B chip set 90b. The M/B chip set 90b is connected with a network interface 90f, a magnetic disk device (HDD) 90g, an audio mechanism 90h, a keyboard/mouse 90i and a flexible disk drive 90j via a bridge circuit 90e.

In FIG. 7, the respective components are connected to one another via buses. For example, the CPU 90a and the M/B chip set 90b are connected, and the M/B chip set 90b and the main memory 90c are connected, through a CPU bus. While the M/B chip set 90b and the display mechanism 90d may be connected via an AGP (accelerated graphics port), if the display mechanism 90d includes a video card compatible with PCI Express, the M/B chip set 90b and the video card are connected through a PCI Express (PCIe) bus. For connection to the bridge circuit 90e, PCI Express, for example, can be used for the network interface 90f. The bridge circuit 90e and the magnetic disk device 90g can be connected, for example, using a serial ATA (AT attachment) bus, a parallel transfer ATA bus, or a PCI (peripheral components interconnect) bus. In addition, the bridge circuit 90e and the keyboard/mouse 90i, and the bridge circuit 90e and the flexible disk drive 90j can be connected using a USB (universal serial bus).

That is, various embodiments can take the form of an entirely hardware implementation, or an implementation containing both hardware and software elements. Further, the various embodiments may be implemented as a computer, a data processing system, or a computer program. Such a computer program can be provided in a form in which the computer program is stored on a computer-readable medium. In this case, conceivable kinds of media are an electronic, magnetic, optical, electromagnetic, infra-red or semiconductor system (apparatus or device) or a propagation medium. Examples of the computer-readable medium include a semiconductor, a solid-state storage device, a magnetic tape, a removable computer diskette, a random access memory (RAM), a read-only memory (ROM), a rigid magnetic disk, and an optical disk. Current examples of optical disks include a compact disk read-only memory (CD-ROM), a compact disk-read/write (CD-R/W), and a digital versatile disk (DVD).

It will be clear to one of ordinary skill in the art that all or part of the method of various embodiments may suitably and usefully be embodied in additional logic apparatus or additional logic apparatuses, comprising logic elements arranged to perform the blocks of the method and that such logic elements may comprise additional hardware components, firmware components or a combination thereof.

It will be equally clear to one of skill in the art that some or all of the functional components of various embodiments may suitably be embodied in alternative logic apparatus or apparatuses comprising logic elements to perform equivalent functionality using equivalent method blocks, and that such logic elements may comprise components such as logic gates in, for example a programmable logic array or application-specific integrated circuit. Such logic elements may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

Various embodiments may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infra-red or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infra-red, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

Various embodiments may be realized in the form of a computer implemented method of deploying a service comprising blocks of deploying computer program code operable to, when deployed into a computer infrastructure and executed thereon, cause the computer system to perform all the blocks of the method.

Various embodiments may be realized in the form of a data carrier having functional data thereon, said functional data comprising functional computer data structures to, when loaded into a computer system and operated upon thereby, enable said computer system to perform all the blocks of the method.

It will be clear to one skilled in the art that many improvements and modifications can be made to the foregoing exemplary embodiment without departing from the scope of the present invention.

What is claimed is:

1. A computer-implemented method for retrieving a document from a plurality of documents divided into a plurality of document groups in which mutually related documents are each included, comprising:
    identifying a plurality of document groups, wherein each document group includes one or more related documents;
    acquiring a retrieval query that includes a plurality of conditions and at least one logical operator that connects the plurality of conditions, wherein the plurality of conditions in the retrieval query includes a group condition that one or more documents belong to a parent-child document group and a document condition that at least one document in the parent-child document group contains a phrase, and wherein the acquiring the retrieval query includes:

acquiring a Boolean retrieval request that includes a logical operator;

determining whether the Boolean retrieval request necessitates an evaluation that spans documents belonging to the same parent-child document group, wherein the parent-child document group is one or more related documents that are treated as each including the same phrase if at least one related document in the parent-child document group contains the phase; and converting, in response to determining that the Boolean retrieval request necessitates an evaluation that spans documents belonging to the same parent-child document group, the Boolean retrieval request into the retrieval query having at least two logical operators, wherein the at least two logical operators in the retrieval query are based on the logical operator in the Boolean retrieval request, and wherein all documents in a document group satisfy the group condition when any of the documents in the document group satisfies the group condition;

identifying, with respect to the group condition, a document group that includes a document that satisfies the group condition;

identifying a document of the plurality of documents in the parent-child document group that satisfies the document condition;

determining that the document is a retrieval result based on the retrieval query; and generating information showing the document that is the retrieval result based on the retrieval query.

2. The method according to claim 1, further comprising storing an index which associates each condition of the plurality of conditions with an identifier allocated to a document satisfying the condition among the plurality of documents, in which a consecutive identifier is allocated to a document that is included in each document group of the plurality of document groups, wherein:

using the index, identifying a document group including a document that, with respect to each condition of the plurality of conditions, satisfy the condition; and using the index, identifying a document satisfying at least one condition among the plurality of conditions.

3. The method according to claim 1, wherein the Boolean retrieval request comprises a first condition and a second condition, wherein the logical operator is an AND logical operator, and wherein the converting the Boolean retrieval request into the retrieval query includes identifying a first group condition that is based on the first condition, a second group condition that is based on the second condition, and a first document condition that is based on the first and second conditions, the method further comprising:

identifying, from among the plurality of document groups, a first document group that includes a document that satisfies the first group condition and a document that satisfies the second group condition;

identifying, from among the plurality of documents, a document that satisfies the first document condition;

determining that the identified document is included in the first document group and that the identified document is the retrieval result based on the retrieval query; and generating information showing the identified document that is the retrieval result based on the retrieval query.

4. The method according to claim 1, wherein the retrieval query comprises a first condition and a second condition that are connected by the at least one logical operator, and wherein the at least one logical operator is a NOT logical operator that follows the first condition and precedes the second condition, the method further comprising:

identifying, from among the plurality of document groups, a first document group that includes a document that satisfies the first condition and a second document group that includes a document that satisfies the second condition;

identifying, from among the plurality of documents, a particular document that satisfies the first condition;

determining that the particular document is included in the first document group and is not included in the second document group;

determining, based on the particular document being in the first document group and not in the second document, and further based on the particular document satisfying the first condition, that the particular document is the retrieval result; and generating information showing the particular document that is the retrieval result based on the retrieval query.

5. The method according to claim 2, wherein the document groups include a parent document and one or more child documents, wherein the parent document is an email, and wherein the one or more child documents include a first attachment and a second attachment, and wherein the email is allocated a first consecutive identifier, the first attachment is allocated a second consecutive identifier, and the second attachment is allocated a third consecutive identifier.

6. The method according to claim 2, wherein the index is an inverted index, wherein the inverted index, with respect to the phrase, holds a particular document number as an identifier that is allocated to the particular document in which the phrase appears.

7. A computer system for retrieving a document from a plurality of documents divided into a plurality of document groups in which mutually related documents are each included, the system comprising:

a memory; and a processor, communicatively coupled to said memory, the computer system configured to perform a method comprising:

identifying a plurality of document groups, wherein each document group includes one or more related documents;

acquiring a retrieval query that includes a plurality of conditions and at least one logical operator that connects the plurality of conditions, wherein the plurality of conditions in the retrieval query includes a group condition that one or more documents belong to a parent-child document group and a document condition that at least one document in the parent-child document group contains a phrase, and wherein the acquiring the retrieval query includes:

acquiring a Boolean retrieval request that includes a logical operator;

determining whether the Boolean retrieval request necessitates an evaluation that spans documents belonging to the same parent-child document group, wherein the parent-child document group is one or more related documents that are treated as each including the same phrase if at least one related document in the parent-child document group contains the phase; and converting, in response to determining that the Boolean retrieval request necessitates an evaluation that spans documents belonging to the same parent-child document group, the Boolean retrieval request into the retrieval query having at least two logical operators, wherein the at least two logical operators in the retrieval query are based on the logical operator in the Boolean retrieval request, and wherein all documents in a document group satisfy the group condition when any of the documents in the document group satisfies the group condition;

identifying, with respect to the group condition, a document group that includes a document that satisfies the group condition;

identifying a document of the plurality of documents in the parent-child document group that satisfies the document condition;

determining that the document is a retrieval result based on the retrieval query; and generating information showing the document that is the retrieval result based on the retrieval query.

8. The system according to claim 7, further comprising storing an index which associates each condition of the plurality of conditions with an identifier allocated to a document satisfying the condition among the plurality of documents, in which a consecutive identifier is allocated to a document that is included in each document group of the plurality of document groups, wherein:

using the index, identifying a document group including a document that, with respect to each condition of the plurality of conditions, satisfy the condition; and using the index, identifying a document satisfying at least one condition among the plurality of conditions.

9. The system according to claim 7, wherein the retrieval Boolean retrieval request comprises a first condition and a second condition, wherein the logical operator is an AND logical operator, and wherein the converting the Boolean retrieval request into the retrieval query includes identifying a first group condition that is based on the first condition, a second group condition that is based on the second condition, and a first document condition that is based on the first and second conditions, the system further comprising:

identifying, from among the plurality of document groups, a first document group that includes a document that satisfies the first group condition and a document that satisfies the second group condition;

identifying, from among the plurality of documents, a document that satisfies the first document condition;

determining that the identified document is included in the first document group and that the identified document is the retrieval result based on the retrieval query; and generating information showing the identified document that is the retrieval result based on the retrieval query.

10. The system according to claim 7, wherein the retrieval query comprises a first condition and a second condition that are connected by the at least one logical operator, and wherein the at least one logical operator is a NOT logical operator that follows the first condition and precedes the second condition, the system further comprising:

identifying, from among the plurality of document groups, a first document group that includes a document that satisfies the first condition and a second document group that includes a document that satisfies the second condition;

identifying, from among the plurality of documents, a particular document that satisfies the first condition;

determining that the particular document is included in the first document group and is not included in the second document group;

determining, based on the particular document being in the first document group and not in the second document, and further based on the particular document satisfying the first condition, that the particular document is the retrieval result; and generating information showing the particular document that is the retrieval result based on the retrieval query.

11. A computer program product for searching retrieving a document from a plurality of documents divided into a plurality of document groups in which mutually related documents are each included, the computer program product comprising a non-transitory computer readable storage medium having computer-readable program code embodied therewith, which when executed by a computer processor, causes the computer processor to implement:

identifying a plurality of document groups, wherein each document group includes one or more related documents;

acquiring a retrieval query that includes a plurality of conditions and at least one logical operator that connects the plurality of conditions, wherein the plurality of conditions in the retrieval query includes a group condition that one or more documents belong to a parent-child document group and a document condition that at least one document in the parent-child document group contains a phrase, and wherein the acquiring the retrieval query includes:

acquiring a Boolean retrieval request that includes a logical operator;

determining whether the Boolean retrieval request necessitates an evaluation that spans documents belonging to the same parent-child document group, wherein the parent-child document group is one or more related documents that are treated as each including the same phrase if at least one related document in the parent-child document group contains the phase; and converting, in response to determining that the Boolean retrieval request necessitates an evaluation that spans documents belonging to the same parent-child document group, the Boolean retrieval request into the retrieval query having at least two logical operators, wherein the at least two logical operators in the retrieval query are based on the logical operator in the Boolean retrieval request, and wherein all documents in a document group satisfy the group condition when any of the documents in the document group satisfies the group condition;

identifying, with respect to the group condition, a document group that includes a document that satisfies the group condition;

identifying a document of the plurality of documents in the parent-child document group that satisfies the document condition;

determining that the document is a retrieval result based on the retrieval query; and generating information showing the document that is the retrieval result based on the retrieval query.

12. The computer program product according to claim 11, further comprising storing an index which associates each condition of the plurality of conditions with an identifier allocated to a document satisfying the condition among the plurality of documents, in which a consecutive identifier is allocated to a parent-child document that is included in each document group of the plurality of document groups and is mutually related to the document satisfying the condition among the plurality of documents, wherein:

using the index, identifying a document group including the parent-child document that, with respect to each condition of the plurality of conditions, satisfy the condition; and using the index, identifying the parent-child document satisfying at least one condition among the plurality of conditions.

13. The computer program product according to claim 11, wherein the Boolean retrieval request comprises a first condition and a second condition, wherein the logical operator is an AND logical operator, and wherein the converting the Boolean retrieval request into the retrieval query includes identifying a first group condition that is based on the first condition, a second group condition that is based on the second condition, and a first document condition that is based on the first and second conditions, the computer program product further comprising:
- identifying, from among the plurality of document groups, a first document group that includes a document that satisfies the first group condition and a document that satisfies the second group condition;
- identifying, from among the plurality of documents, a document that satisfies the first document condition;
- determining that the identified document is included in the first document group and that the identified document is the retrieval result based on the retrieval query; and
- generating information showing the identified document that is the retrieval result based on the retrieval query.

14. The computer program product according to claim 11, wherein the retrieval query comprises a first condition and a second condition that are connected by the at least one logical operator, and wherein the at least one logical operator is a NOT logical operator that follows the first condition and precedes the second condition, the computer program product further comprising:
- identifying, from among the plurality of document groups, a first document group that includes a document that satisfies the first condition and a second document group that includes a document that satisfies the second condition;
- identifying, from among the plurality of documents, a particular document that satisfies the first condition;
- determining that the particular document is included in the first document group and is not included in the second document group;
- determining, based on the particular document being in the first document group and not in the second document, and further based on the particular document satisfying the first condition, that the particular document is the retrieval result; and
- generating information showing the particular document that is the retrieval result based on the retrieval query.

* * * * *